United States Patent
Conrad et al.

(10) Patent No.: US 11,505,246 B2
(45) Date of Patent: Nov. 22, 2022

(54) TRAILER JACKKNIFE WARNING SYSTEM WITH CORRECTIVE STEERING INDICATOR

(71) Applicant: Toyota Motor Engineering & Manufacturing North America, Inc., Plano, TX (US)

(72) Inventors: Chris Conrad, Ann Arbor, MI (US); Ryo Omata, Dexter, MI (US); Ajay M. Hirve, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 86 days.

(21) Appl. No.: 17/077,803

(22) Filed: Oct. 22, 2020

(65) Prior Publication Data

US 2022/0126915 A1    Apr. 28, 2022

(51) Int. Cl.
| | | |
|---|---|---|
| *B60D 1/00* | (2006.01) | |
| *B60W 50/00* | (2006.01) | |
| *B62D 13/06* | (2006.01) | |
| *B60R 16/023* | (2006.01) | |

(52) U.S. Cl.
CPC .......... *B62D 13/06* (2013.01); *B60R 16/0232* (2013.01)

(58) Field of Classification Search
CPC .................................................... B62D 13/06
See application file for complete search history.

(56) References Cited

U.S. PATENT DOCUMENTS

| | | | |
|---|---|---|---|
| 7,693,627 B2 | 4/2010 | Natsume | |
| 9,132,856 B2 | 9/2015 | Shepard | |
| 9,168,951 B2 | 10/2015 | Chiu et al. | |
| 9,896,130 B2 | 2/2018 | Ghneim et al. | |
| 10,214,241 B2 | 2/2019 | Shepard | |
| 2017/0073004 A1* | 3/2017 | Shepard | B62D 15/028 |
| 2018/0001928 A1 | 1/2018 | Lavoie et al. | |
| 2018/0346025 A1* | 12/2018 | Shepard | B60D 1/36 |
| 2019/0118860 A1* | 4/2019 | Gali | H04N 5/232 |
| 2021/0149044 A1* | 5/2021 | Sim | B60T 7/22 |
| 2021/0206213 A1* | 7/2021 | Matsushita | B60R 11/04 |

FOREIGN PATENT DOCUMENTS

| | | |
|---|---|---|
| DE | 102013000198 A1 | 7/2014 |
| DE | 102017007473 A1 | 1/2018 |

* cited by examiner

*Primary Examiner* — Joseph H Feild
*Assistant Examiner* — Pameshanand Mahase
(74) *Attorney, Agent, or Firm* — Haynes and Boone, LLP (57) ABSTRACT

Disclosed is a system comprising a vehicle, a trailer, and a display screen. The system includes a trailer angle between a centerline of the vehicle and a centerline of the trailer. At least one time step after the vehicle is driven backward such that the trailer angle increases beyond a threshold value, a steering warning icon is displayed on the display screen. When the trailer angle decreases below the threshold value, the steering warning icon is removed from the display screen.

18 Claims, 9 Drawing Sheets

TRAILER JACKKNIFE WARNING SYSTEM WITH CORRECTIVE STEERING INDICATOR

TECHNICAL FIELD

The subject matter described herein relates to devices, systems, and methods for predicting a trailer jackknife condition while a vehicle is backing up, and providing corrective steering information to the vehicle's driver. This technology has particular but not exclusive utility for maneuvering trailers towed by cars and trucks.

BACKGROUND

Vehicles of various types may be fitted with a trailer, which is towed behind the vehicle using a trailer hitch or similar linkage. Trailers may for example carry passengers, dwellings, cargo, or other vehicles. Some drivers may find it challenging to back up a vehicle while towing a trailer, for example during fueling, parking, loading, unloading, boat launching, or other activities. Since the trailer is able to swivel around the linkage, the response of the trailer to vehicle steering inputs may be counterintuitive to some drivers, leading to a divergence between the vehicle centerline and the trailer centerline. If the angle between the vehicle centerline and trailer centerline (hereinafter referred to as the trailer angle, trailer divergence angle, or hitch angle) exceeds a certain value, the vehicle and trailer are at risk of a jackknife condition, wherein the vehicle and trailer form a V shape, such that any further backing by the vehicle will further increase the trailer divergence angle and/or cause a side of the trailer to collide with a side of the vehicle, potentially causing damage. During a jackknife condition, one or more wheels of the trailer may also be at risk of losing contact with the ground, and in extreme cases the trailer may capsize. Alternatively, in cases where the mass of the trailer is similar to or greater than the mass of the vehicle, the loss of ground contact and/or capsizing may occur to the vehicle instead or in addition to a loss of ground contact or capsizing of the trailer.

In view of these problems, it may therefore be desirable for systems in the vehicle to monitor the trailer angle during backing operations, to predict an imminent jackknife condition, and to provide braking and/or counter-steering instructions to the vehicle driver.

The information included in this Background section of the specification, including any references cited herein and any description or discussion thereof, is included for technical reference purposes only and is not to be regarded as limiting.

SUMMARY

The present disclosure provides a sensing system to inform a driver about a prediction of an imminent jackknife condition during trailer backing, and to recommend corrective actions that may for example include steering or braking. The trailer jackknife warning system provides an improvement over the current technology by providing necessary jackknife warning and mitigation information in a single icon, displayed on a screen (e.g., a dashboard head unit) that is viewable by the vehicle driver during trailer backing operations.

The trailer jackknife warning system disclosed herein has particular, but not exclusive, utility for the backing of trailers towed by cars and trucks. One general aspect of the trailer jackknife warning system includes a system, which includes a vehicle, a trailer, a trailer angle between a centerline of the vehicle and a centerline of the trailer, and a display screen. The system also includes a steering warning icon where, at least one time step after the vehicle is driven backward such that the trailer angle increases beyond a threshold value, the steering warning icon is displayed on the display screen. When the trailer angle decreases below the threshold value, the steering warning icon is removed from the display screen. Other embodiments of this aspect include corresponding computer systems, apparatus, and computer programs recorded on one or more computer storage devices, each configured to perform the actions of the methods.

Implementations may include one or more of the following features. In some embodiments, the steering warning icon includes a steering wheel representation and a turning direction instruction to reduce the trailer angle. In some embodiments, the steering wheel representation includes an angle of the steering wheel indicative of a desired turning direction to reduce the trailer angle. In some embodiments, the steering warning icon is not displayed on the display screen unless the vehicle is stopped. In some embodiments, after the vehicle is driven backward such that the trailer angle increases beyond a threshold value, and before the vehicle is stopped, a brake warning icon is displayed on the display screen to instruct a vehicle driver to stop the vehicle. In some embodiments, after the vehicle is stopped, if the trailer angle is greater than the threshold value, a drive-forward warning icon is displayed on the display screen to instruct the vehicle driver to drive the vehicle forward. In some embodiments, a representation of the vehicle is displayed along with the steering warning icon. In some embodiments, a trailer direction indicator is displayed along with the steering warning icon, where the trailer direction indicator indicates a direction the trailer will travel based on a current position of a steering wheel of the vehicle. In some embodiments, the at least one time step is based on a human reaction time. In some embodiments, the trailer angle is a predicted trailer angle. Implementations of the described techniques may include hardware, a method or process, or computer software on a computer-accessible medium.

One general aspect includes a method for directing a trailer of a vehicle. The method includes, for a vehicle with a trailer attached, while the vehicle is moving in a reverse direction: measuring a measured trailer angle between a centerline of the vehicle and a centerline of the trailer; predicting a predicted trailer angle at least one time step in the future based on the measured trailer angle; when the predicted trailer angle is greater than a threshold value, displaying a steering warning icon on a display screen of the vehicle; and when the predicted trailer angle decreases below the threshold value, removing the steering warning icon from the display screen. Other embodiments of this aspect include corresponding computer systems, apparatus, and computer programs recorded on one or more computer storage devices, each configured to perform the actions of the methods.

Implementations may include one or more of the following features. In some embodiments, the steering warning icon includes a steering wheel representation and a turning direction instruction to reduce the predicted trailer angle. In some embodiments, the steering wheel representation includes an angle of the steering wheel indicative of a desired turning direction to reduce the predicted trailer angle. In some embodiments, the steering warning icon is not displayed on the display screen unless the vehicle is stopped. In some embodiments, while the vehicle is moving in a reverse direction and before the vehicle is stopped, a brake warning icon is displayed on the display screen to instruct a vehicle driver to stop the vehicle. In some embodiments, after the vehicle is stopped, if the predicted trailer angle is greater than the threshold value, a drive-forward warning icon is displayed on the display screen to instruct the vehicle driver to drive the vehicle forward. In some embodiments, a representation of the vehicle is displayed along with the steering warning icon. In some embodiments, a trailer direction indicator is displayed along with the steering warning icon, where the trailer direction indicator indicates a direction the trailer will travel based on a current position of a steering wheel of the vehicle. In some embodiments, the at least one time step is based on a human reaction time. Implementations of the described techniques may include hardware, a method or process, or computer software on a computer-accessible medium.

One general aspect includes a device for directing a trailer of a vehicle while the vehicle is backing up. The device includes a sensor for measuring a measured trailer angle between a centerline of the vehicle and a centerline of the trailer. The device also includes a display screen and a processor configured to: compute a predicted trailer angle based on the measured trailer angle; display, on the display screen, a steering warning icon when the predicted trailer angle exceeds a threshold value; and remove the warning icon from the display screen when the predicted trailer angle decreases below the threshold value. The steering warning icon includes a steering wheel representation and a turning direction instruction to reduce the trailer angle, and the steering wheel representation includes an angle of the steering wheel indicative of a desired turning direction to reduce the trailer angle. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the trailer jackknife warning system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

In accordance with at least one embodiment of the present disclosure, a trailer jackknife warning system is provided that predicts an imminent jackknife condition between a vehicle and trailer during backing operations, informs the vehicle driver about the prediction, recommends corrective actions that may for example include braking, steering, or driving forward to straighten the trailer. The trailer jackknife warning system provides an improvement over the current technology by providing warning and mitigation information in a single icon, displayed on a display screen (e.g., a dashboard head unit) that is viewable by the vehicle driver.

Because many drivers consider trailer backing a challenging task, there is a need to provide a simple, easy to interpret visual icon that serves as both a jackknife warning and steering countermeasure instruction all in one simple, easy to understand icon so that the information can be quickly and easily processed and countermeasures implemented before a jackknife/collision occurs. The present disclosure provides a jackknife warning to a driver of a towing vehicle when a trailer hitch angle exceeds a jackknife threshold limit and then provides steering direction as a countermeasure to move the hitch angle away from the jackknife threshold.

The present disclosure aids substantially in backing up a vehicle that is towing a trailer, by improving the ability of the vehicle driver to ascertain that a jackknife condition may be imminent, and to receive relevant instructions to avoid or mitigate the jackknife condition. In some embodiments, such instructions may be provided in a single icon, and may for example include braking, right counter-steer, left counter-steer, or drive forward instructions, or in some cases a braking or drive forward instruction simultaneously with a left or right steering instruction. Implemented on a screen display in communication with sensors and a processor, the trailer jackknife warning system disclosed herein provides practical guidance to the vehicle driver during trailer backing operations. This improved situational awareness transforms a challenging multi-step or multi-person operation into one that can be safely performed by a vehicle driver, without the normal routine of needing to exit the vehicle or engage the services of a spotter. This unconventional approach improves the functioning of the vehicle, by reducing the amount of time and effort required to back up a trailer along a desired path or toward a desired target. The desired path may for example be presumed to fall along the vehicle centerline at the time trailer backing begins, or may be selectable by the driver or another user either informally or via an interface engine 155. The desired target may for example be presumed to exist directly behind the vehicle at the time trailer backing begins, or may be selectable by the driver or another user either informally or via a user interface.

The trailer jackknife warning system may be implemented for example through a screen-based user interface, with annotated photographic or graphical images that are viewable on the screen display, and operated by a control process executing on a processor that accepts inputs from sensors placed on the vehicle or trailer, and/or from a user via a touchscreen, control panel, joystick, switches, buttons, or other user interface. In that regard, the control process performs certain specific operations in response to different inputs or received at different times, either from one or more sensors, or from a vehicle operator. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the trailer jackknife warning system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
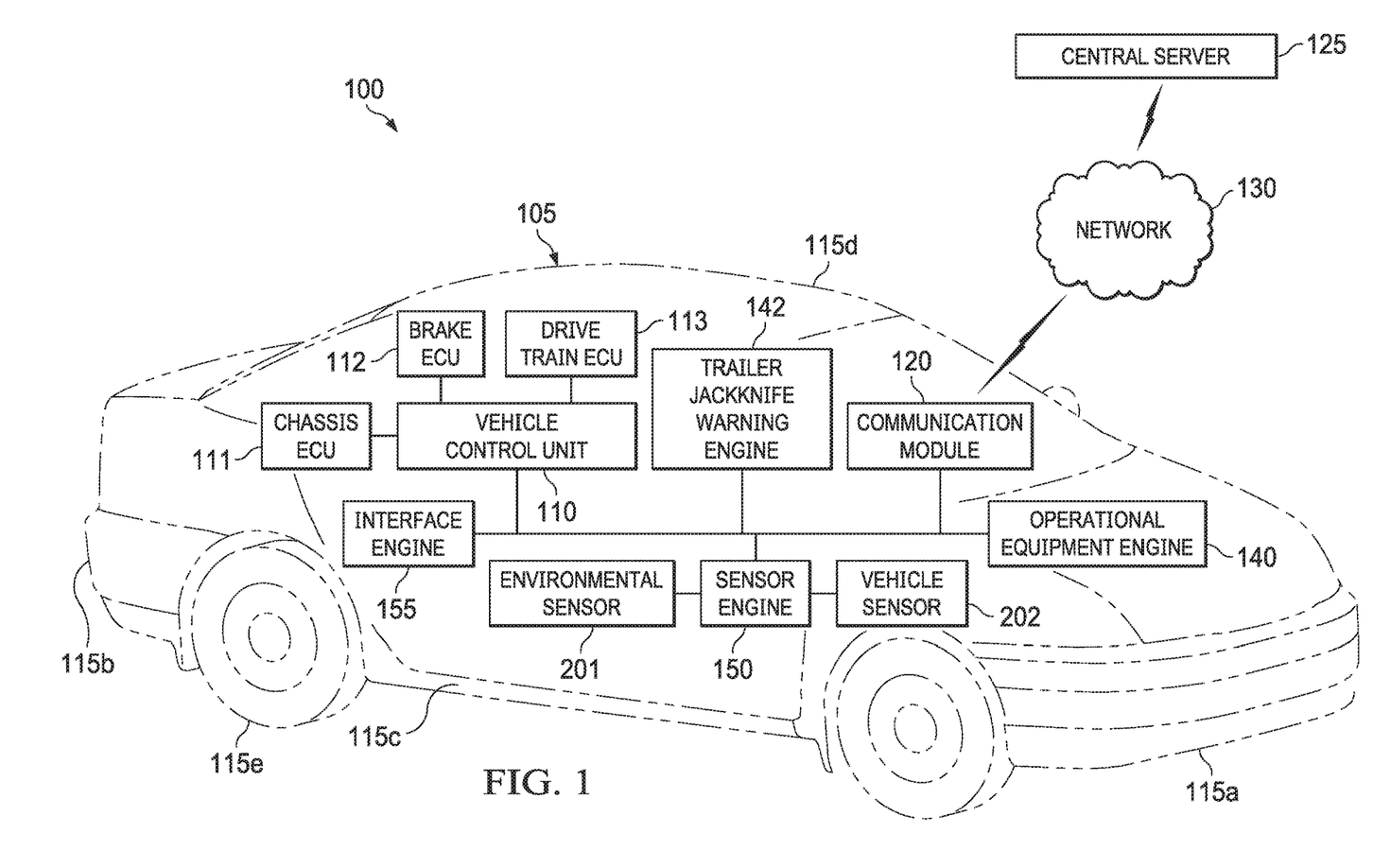
FIG. 1 is a diagrammatic illustration of a trailer jackknife warning system in accordance with at least one embodiment of the present disclosure.

FIG. 1 is a diagrammatic illustration of a trailer jackknife warning system in accordance with at least one embodiment of the present disclosure. In an example, a trailer jackknife warning system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the trailer jackknife warning system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor and drivetrain. The system also includes one or more environmental sensors 201, one or more vehicle sensors 202, and a trailer jackknife warning engine 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
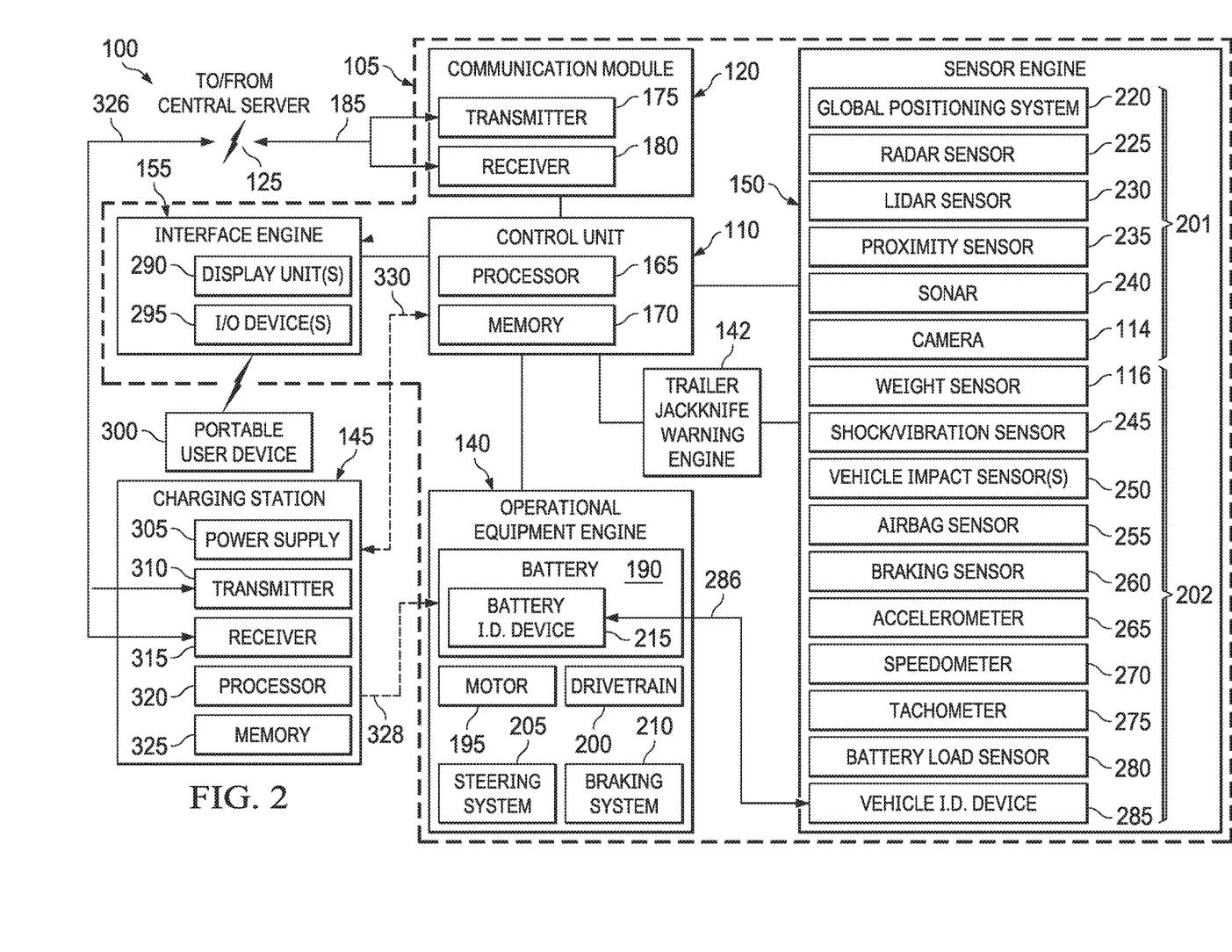
FIG. 2 is a diagrammatic illustration, in a block-diagram form, of at least a portion of the trailer jackknife warning system of FIG. 1, in accordance with at least one embodiment of the present disclosure.

FIG. 2 is a diagrammatic illustration, in a block-diagram form, of at least a portion of the trailer jackknife warning system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a radar sensor 225, a lidar sensor 230, a proximity sensor 235, a sonar sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, a camera 114, a weight sensor 116, or any combinations thereof. The sensors or other detection devices may be configured to sense or detect activity, conditions, and circumstances in an area to which the device has access, e.g., conditions inside or outside the vehicle cabin. Such sensors may include, but are not limited to, angle sensors, rotary encoders, or linear encoders. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seat back, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The trailer jackknife warning system 100 also includes a trailer jackknife warning engine 142, the operation of which will be described below. In some embodiments, the trailer jackknife warning engine 142 comprises a standalone housing with its own processor and memory. In other embodiments, the trailer jackknife warning engine 142 exists as software, firmware, or hardware within another processor, such as the vehicle control unit 110, operational equipment engine 140, or power train ECU 113. The sensor engine 150 includes environmental sensors 201 and vehicle sensors 202. In an example, the trailer jackknife warning engine 142 receives sensor data from one or more rear-facing sensors, which may for example be radar sensors 225, lidar sensors 230, proximity sensors 235, sonar sensors 240, cameras 114, load cells, linear encoders, rotary encoders, or other sensors 201 or 202 in order to determine the trailer angle.

A reader of ordinary skill in the art will understand that other components or arrangements of components may be found in a vehicle 105, and that the same general principles apply to electric vehicles, internal combustion vehicles, and hybrid vehicles.

Figure 3:
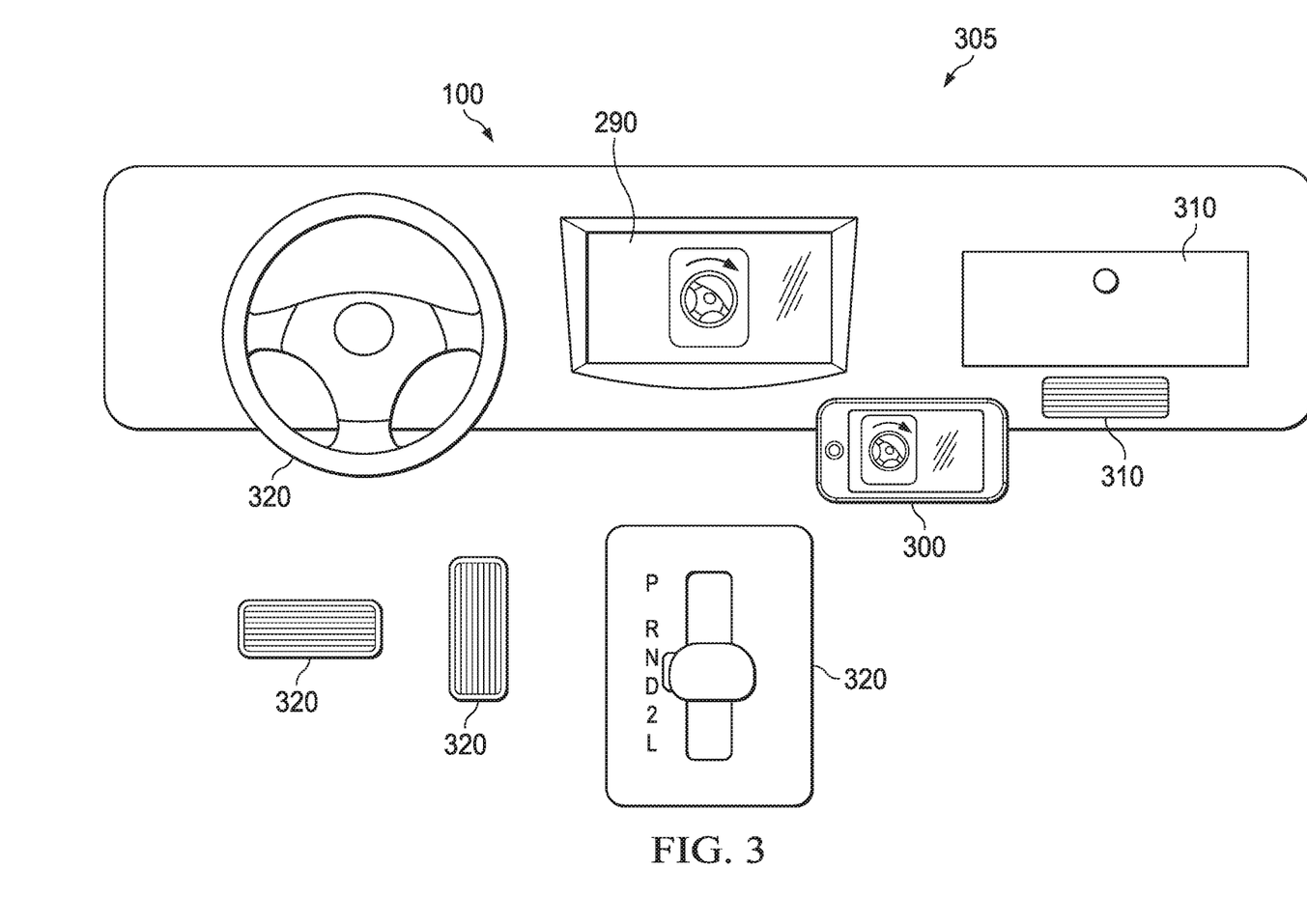
FIG. 3 is a diagrammatic illustration of an example vehicle cabin that includes a trailer jackknife warning system in accordance with at least one embodiment of the present disclosure.

FIG. 3 is a diagrammatic illustration of an example vehicle cabin 305 that includes a trailer jackknife warning system 100 in accordance with at least one embodiment of the present disclosure. Visible are vehicle interior design features 310 and driving controls 320, a head unit 290, and a mobile device 300. In an example, during normal backing operations, the head unit 290 may display the view from a backup camera. However, the presence of a trailer may partially or fully block the view of the backup camera. Therefore, in some embodiments of the trailer jackknife warning system 100, instead of or in addition to the view from the backup camera, the head unit 290 and/or mobile device 300 display real-time data from the trailer jackknife warning engine 142 (as shown for example in FIGS. 1 and 2), or processor circuit 750 (as shown for example in FIG. 7), during trailer backing operations. These real-time views enable the vehicle's driver to see, at a glance, the driving steps (e.g., steering, braking, or driving forward) required to prevent a jackknife condition. The driver can then back up the trailer, without needing a spotter outside the vehicle, without needing to refer to blocked or partial views through a mirror, and without needing to exit the vehicle to assess the trailer angle, trailer divergence angle, or hitch angle firsthand. The trailer jackknife warning system 100 may be activated by a button push or menu selection, or may be activated automatically by a control unit based on data received from one or more sensors.

In some embodiments, the displayed real-time data from the trailer jackknife warning engine may comprise a visual, schematic, or diagrammatic representation of the vehicle and/or trailer. For example, in some embodiments, the displayed real-time data from the trailer jackknife warning engine may comprise visual icons containing driving instructions to the vehicle driver.

Figure 4:
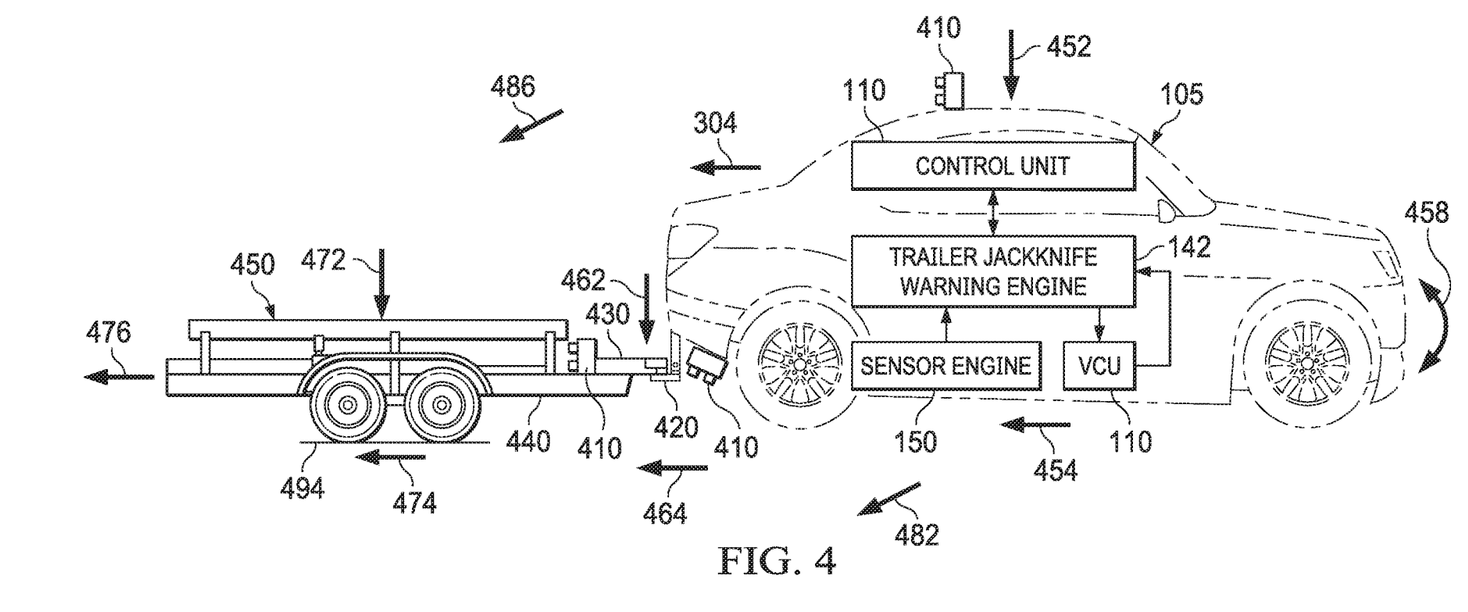
FIG. 4 is a diagrammatic illustration of an example trailer jackknife warning system of a vehicle towing a trailer in accordance with at least one embodiment of the present disclosure.

FIG. 4 is a diagrammatic illustration of an example trailer jackknife warning system 100 of a vehicle 105 towing a trailer 450 in accordance with at least one embodiment of the present disclosure. In this implementation, for clarity, only certain engines are shown. However, other engines or system, including those describe herein, are also contemplated as being a part of the vehicle shown in FIG. 4. In the example shown, within the vehicle 105 the VCU 110, sensor engine 150, and communications module 120 are in communication with a trailer jackknife warning engine 142 that is capable of performing additional operations specific to sensing, estimating, computing, and displaying information about the trailer angle and the driving steps required to prevent a jackknife condition. In the example shown in FIG. 4, the vehicle 105 includes a trailer hitch 420 that connects to a removable coupler 430 which is fixedly attached to the tongue 440 of a trailer 450.

Force variables that may affect trailer backing operations include but are not limited to the vehicle absolute weight 452, vehicle rolling friction 454, vehicle aerodynamic drag 304, vehicle pitch 458, trailer pitch 478, trailer tongue weight 462, trailer tongue drag 464, trailer absolute weight 472, trailer rolling friction 474, and trailer aerodynamic drag 476. In some examples, each of these variables is a force that may be expressed in lbf, Newtons, or any other unit of force as desired. If force sensors exist in the trailer hitch 420, it may be possible to obtain a direct measurement of the tongue weight 462 and tongue drag 464, where tongue drag is approximately equal to the trailer rolling resistance 484. The total rolling resistance 486 of the vehicle with trailer is the vector sum of the vehicle rolling resistance 482 and trailer rolling resistance 484. In some embodiments, one or more of these force variables are measured, calculated, estimated, or looked up by a control unit (e.g., VCU 110) during towing or trailer backing operations.

The trailer jackknife warning engine 142 receives data from one or more sensors 410 positioned on the vehicle 105 and/or the trailer 450. This sensor data may include camera, radar, sonar, lidar, weight, RF shadow, linear position, rotary position, or other spatial data sufficient to determine the relative positions and orientations of the vehicle 105 and trailer 450. In some embodiments, the trailer jackknife warning engine 142 constructs a 2D or 3D model that includes at least the trailer 450 and the vehicle 105.

Figure 5A:
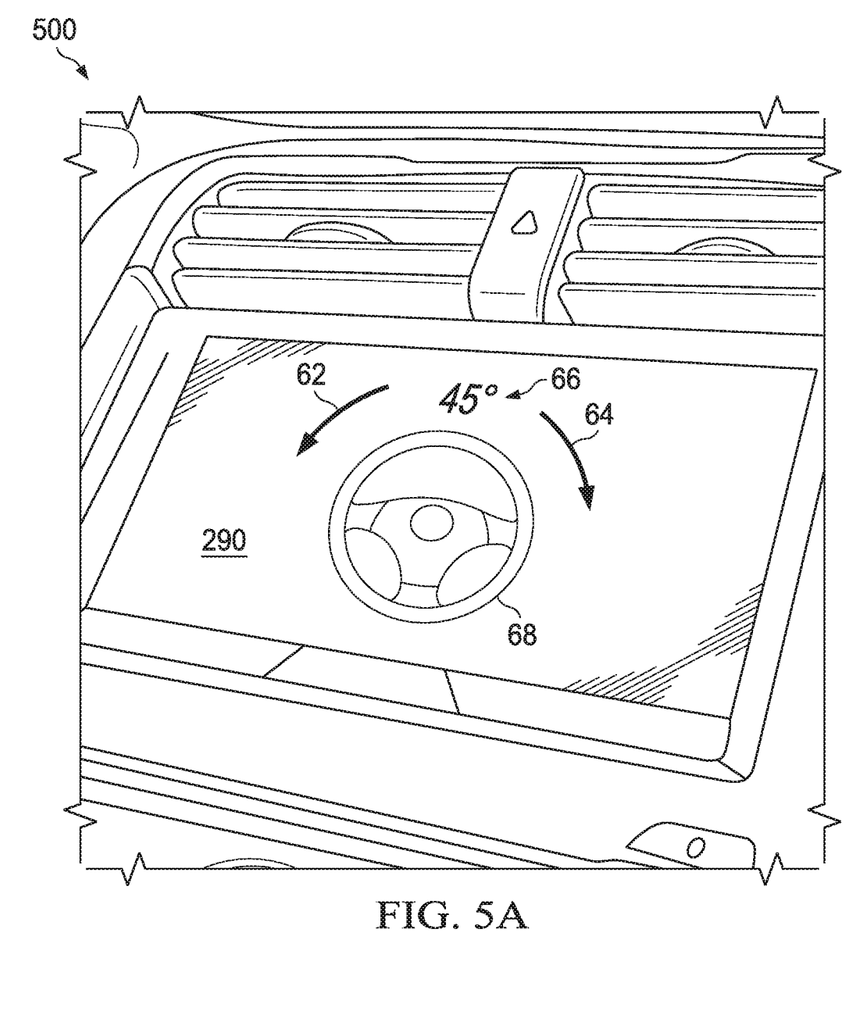
FIG. 5A is an example diagrammatic screen display of an example trailer jackknife warning system in accordance with aspects of the present disclosure.

FIG. 5A is an example diagrammatic screen display 500 of an example trailer jackknife warning system 100 in accordance with aspects of the present disclosure. In the example shown in FIG. 5A, the screen display 500 is visible on a display unit 290 (e.g., the dashboard head unit) of the vehicle 105. However, in other examples it could be visible on a different display unit 290, or on the display of a portable user device 300 such as a smartphone, tablet, or laptop computer.

In some embodiments, the screen display 500 includes a simplified (e.g., graphical, symbolic, iconographic, or diagrammatic) view of a 2D or 3D model generated in real time or near real time by the trailer jackknife warning system. In the example shown in FIG. 5, the screen display 500 includes a steering wheel icon 68, a left steering direction arrow 62 (highlighted), a right steering direction arrow 64 (not highlighted), and a desired steering angle indicator 66. Such icons may for example be used with vehicle driving instructions or parking assist systems that direct a driver to turn the steering wheel in order to maneuver the vehicle and/or trailer along a desired path or toward a selected target.

Figure 5B:
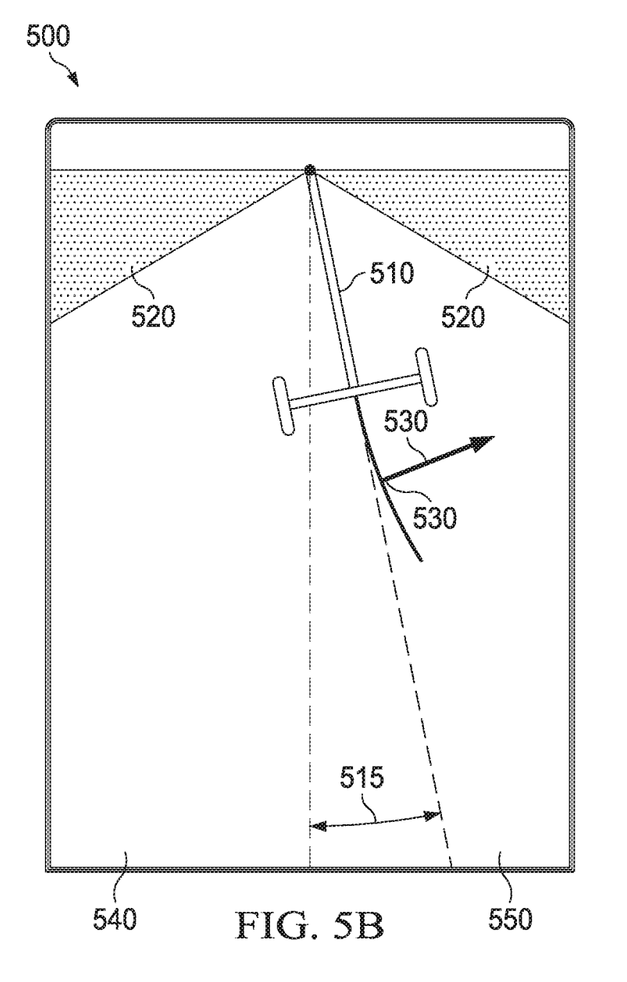
FIG. 5B is an example screen display of an example trailer jackknife warning system in accordance with aspects of the present disclosure.

FIG. 5B is an example screen display 500 of an example trailer jackknife warning system 100 in accordance with aspects of the present disclosure. The screen display 500 may comprise one or more views including the relationship between the trailer 450 and vehicle 105, including but not limited to a side view, a top view, a bottom view, a rear view (e.g., as though through a virtual rearview mirror of the vehicle 105 of seeing through the trailer 450), a perspective view, or a forward-facing view (e.g., as though standing behind the trailer 450). In some embodiments, multiple views are shown simultaneously. In other embodiments, the user may switch between different views. In still other embodiments, a default view is presented by the system and cannot be changed.

In some embodiments, a detected jackknife condition may be communicated to the driver by highlighting a rearward image on a display or overlaying a graphic onto an image of the trailer or trailer hitch connection. Such systems may appear as a highlighted, color-changing, or blinking indicator. The vehicle 105 and/or trailer 450 (as shown for example in FIG. 4) may be displayed photographically, graphically, symbolically, iconographically, as silhouettes or wireframes, or otherwise. In an example, a vehicle driver, viewing the screen display 500 on a vehicle head unit or other display 290, or on a portable device 300, is able to observe, in real time or near-real-time, the hitch angle, trailer angle, or trailer divergence angle 515 of the trailer 450 (e.g., the angle between the centerline of the vehicle and the centerline of the trailer).

In the example shown in FIG. 5B, the screen display 500 includes a representation 510 of the trailer 450 and of the trailer angle 515, and a trailer direction prediction indicator 530. The screen display 500 also includes one or more jackknife warning regions 520, a safe backing region 540, and a desired backing region 550.

Figure 5C:
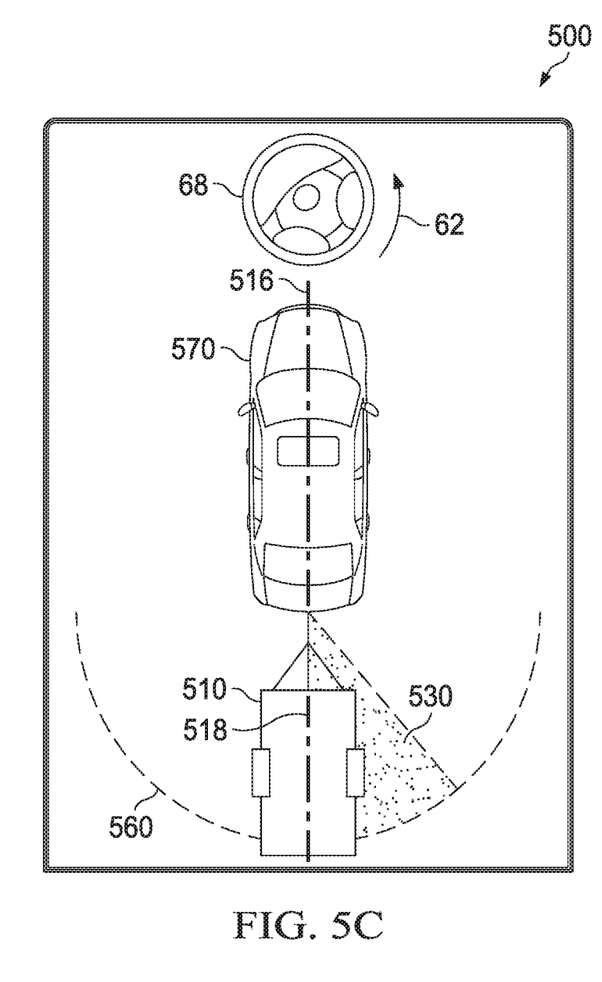
FIG. 5C is an example screen display of an example trailer jackknife warning system in accordance with aspects of the present disclosure.

FIG. 5C is an example screen display 500 of an example trailer jackknife warning system 100 in accordance with aspects of the present disclosure. In the example shown in FIG. 5C, the screen display 500 includes a representation 510 of the trailer 450, and a representation 570 of the vehicle 105. The screen display also includes a steering wheel icon 68. In this example, the screen display 500 also includes a left steering instruction indicator 62, a trailer direction prediction indicator 530, and an arc 560 that indicates the range of possible trailer angles. Also visible are a vehicle centerline 516 and a trailer centerline 518.

Figure 6A:
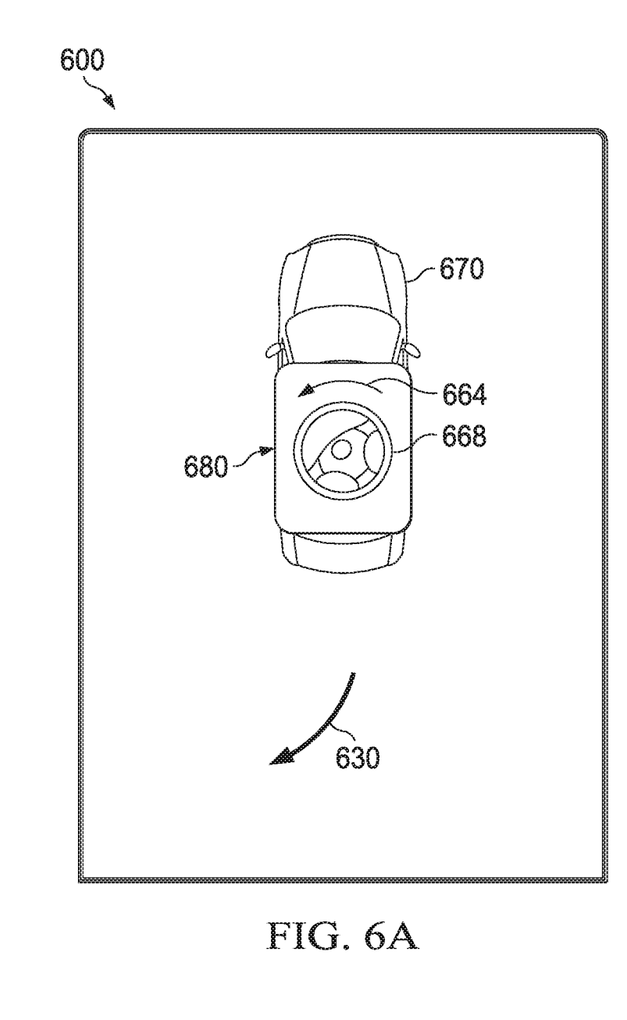
FIG. 6A is an example screen display of an example trailer jackknife warning system in accordance with at least one embodiment of the present disclosure.

FIG. 6A is an example screen display 600 of an example trailer jackknife warning system 100 in accordance with at least one embodiment of the present disclosure. In the example shown in FIG. 6A, the screen display 600 includes a representation 670 of the vehicle 105, a trailer direction prediction indicator 630, and a single warning icon 680 that includes counter-steering graphic indicating which direction (left or right) the driver should turn the steering wheel to reduce the trailer angle and thus avoid a jackknife condition. In this example, the single warning icon includes a steering wheel representation 668 and a left steering instruction indicator 664. In some embodiments, the steering wheel representation 668 includes a visual representation of a desired orientation of the steering wheel to achieve a desired turning of the vehicle 105 and trailer 450.

In some embodiments, this combined steering wheel representation 668 and steering instruction indicator 664 can be used to instruct the driver to turn the steering wheel to change the hitch angle or trailer angle in a manner that moves the trailer away from a potential jackknife condition. Thus, the single icon 680 provides, at a glance, information the driver needs to avoid the jackknife condition and back the trailer along a desired path or toward a desired target.

In some embodiments, the countermeasure steering instruction (where the direction arrow 664 indicates the direction the driver must rotate the steering wheel to back away from the jackknife threshold), turns off after a short distance or angle away from a jackknife warning limit/angle. Therefore, the jackknife warning system 100 of the present disclosure limits driver distraction and notifies a driver when a hitch angle has reached a jackknife threshold limit. To further limit driver distraction, the warning may then be turned off shortly after the hitch angle is backed away from the threshold limit.

In some embodiments, the jackknife warning icon 680 may be used in various trailer assist systems. The icon may be used in a system that include a method for calculating jackknife threshold limits (factoring in vehicle parameters, trailer dimensions, anticipated driver reaction time, etc.), detecting when the threshold has been reached, instructing the driver to stop the vehicle and then issuing the jackknife warning icon.

The jackknife warning icon provides a warning function (displaying the icon image 680 to the driver) as well as a steering direction countermeasure to instruct the driver on which direction to rotate the steering wheel to avoid the predicted jackknife occurrence. The steering function is provided by the steering wheel representation 668 and directional arrow 664 to indicate the steering direction. The present disclosure provides these features in one simple and easy-to-understand graphic, to allow a driver to quickly react to the warning, which may for example be made visible to the driver on an interior monitor, service light, or any other display visible to the driver.

The use of a single graphical icon 680 as a jackknife warning and a driver steering assist thus provides a countermeasure steering direction by which the driver is instructed to turn the steering wheel in a direction to avoid the jackknife condition. The steering and the icon is no longer displayed once the hitch angle is sufficiently distanced from the jackknife threshold limit. Thus, in some embodiments, the timing and duration for which the single warning icon

680 will be illuminated is a function of the hitch angle relative to the threshold limit, rather than vehicle position or other factors.

Figure 6B:
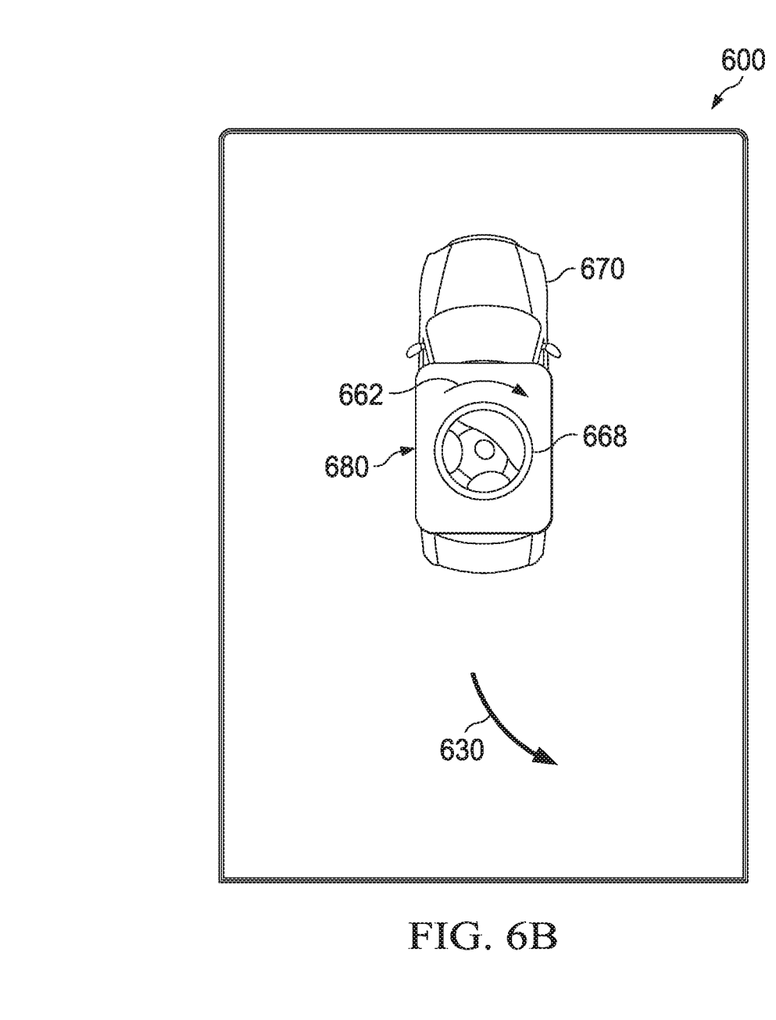
FIG. 6B is an example screen display of an example trailer jackknife warning system in accordance with at least one embodiment of the present disclosure.

FIG. 6B is an example screen display 600 of an example trailer jackknife warning system 100 in accordance with at least one embodiment of the present disclosure. In the example shown in FIG. 6B, the screen display 600 includes a representation 670 of the vehicle 105, a trailer direction prediction indicator 630, and a single warning icon 680 that includes counter-steering graphic indicating which direction (left or right) the driver should turn the steering wheel to reduce the trailer angle and thus avoid a jackknife condition. In this example, the single warning icon includes a steering wheel representation 668 (oriented to the right to indicate the desired orientation of the steering wheel), and a right steering instruction indicator 662.

Figure 7:
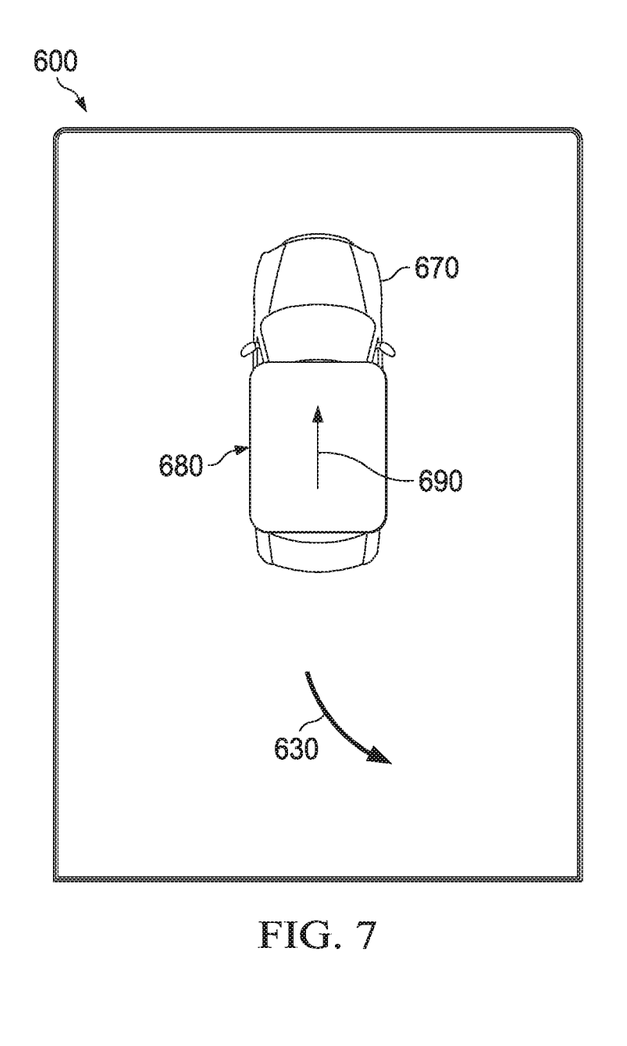
FIG. 7 is an example screen display of an example trailer jackknife warning system in accordance with at least one embodiment of the present disclosure.

FIG. 7 is an example screen display 600 of an example trailer jackknife warning system 100 in accordance with at least one embodiment of the present disclosure. In the example shown in FIG. 7, the screen display 600 includes a representation 670 of the vehicle 105, a trailer direction prediction indicator 630, and a single warning icon 680 that includes a "drive forward" instruction indicator 690. The "drive forward" instruction indicator alerts the driver that in order to reduce the trailer angle and prevent a jackknife condition, it is now necessary to pull the vehicle forward and thus straighten out the trailer.

Figure 8:
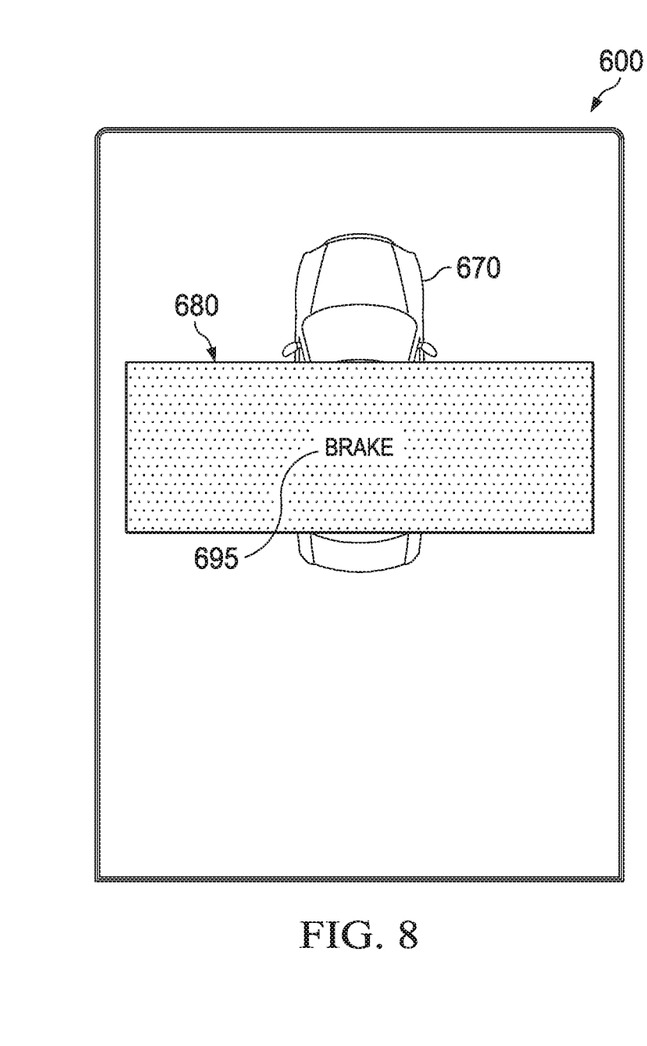
FIG. 8 is an example screen display of an example trailer jackknife warning system in accordance with at least one embodiment of the present disclosure.

FIG. 8 is an example screen display 600 of an example trailer jackknife warning system 100 in accordance with at least one embodiment of the present disclosure. In the example shown in FIG. 8, the screen display 600 includes a representation 670 of the vehicle 105 and a single warning icon 680 that includes a "brake" instruction indicator 695. The "brake" instruction indicator alerts the driver that in order to prevent a jackknife condition, it is now necessary to stop the vehicle.

Figure 9:
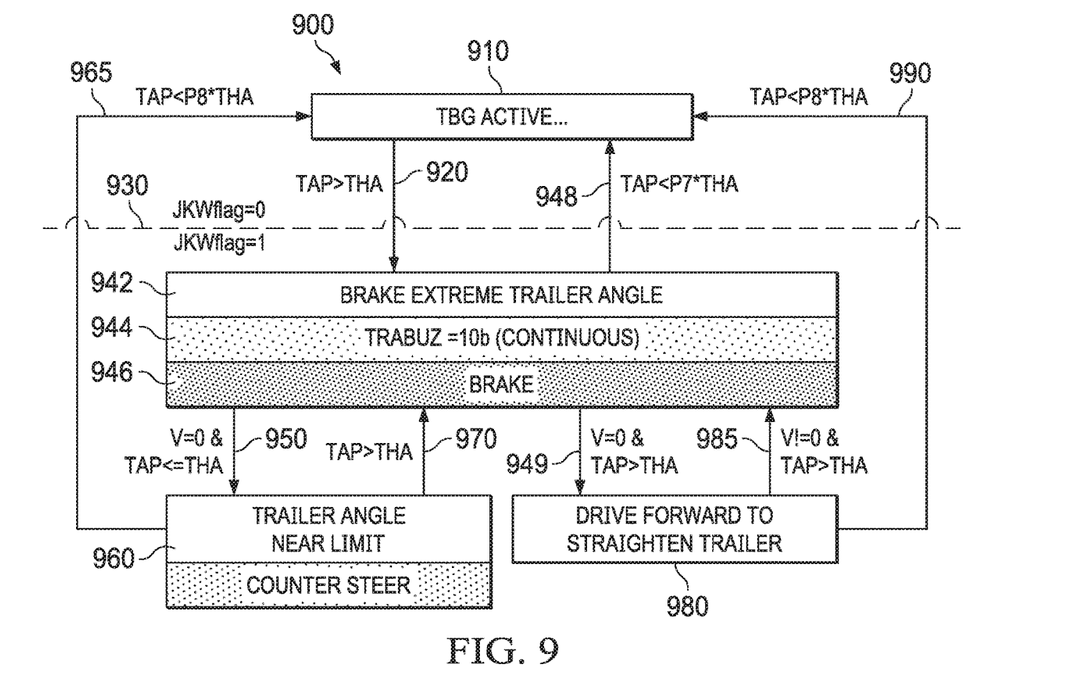
FIG. 9 is a flow diagram of an example trailer jackknife warning system control method according to at least one embodiment of the present disclosure.

FIG. 9 is a flow diagram of an example trailer jackknife warning system control method 900 according to at least one embodiment of the present disclosure. It is understood that the steps of method 900 may be performed in a different order than shown in FIG. 9, additional steps can be provided before, during, and after the steps, and/or some of the steps described can be replaced or eliminated in other embodiments. One or more of steps of the method 900 can be carried by one or more devices and/or systems described herein, such as the VCU 110 or trailer jackknife warning engine 142 of FIGS. 1 and 2, and/or processor circuit 1050 of FIG. 10. Although the steps or operations of the example method 900 are shown in a linear sequence, it is understood that at least some of the steps or operations may occur in parallel and/or under the control of a real-time operating system (RTOS). Additionally, the trailer jackknife warning system control method may be used for modes other than driver manual steering such as automatic/assisted steering control of a backing trailer, or in an override mode whereby the driver has taken manual control of the steering wheel, thus suspending automated steering control.

In some embodiments, trailer angle may be calculated at one or more time steps (e.g., over a 'predicting horizon' based upon the time needed for a driver to react to a warning and stop a trailer prior to a jackknife situation—defined as "driver reaction time"). This predicted trailer angle may for example be calculated using a non-linear kinematic model:

$$\dot{\gamma} = \left(\frac{u}{L}\tan\phi + \frac{u}{b}\frac{a}{L}\tan\phi\cos\gamma - \frac{u}{b}\sin\gamma\right)$$ Equation 1 wherein γ is the trailer angle, γ̇ is the rate of trailer angle change, u is the speed of the vehicle or trailer, φ is the tire angle of the vehicle, a is the distance between the trailer hitch and the vehicle's rear axle, b is the distance between the trailer hitch and an axle of the trailer, and L is wheel base of the trailer. Predicted trailer angle (TAP) at an upcoming time t+Δt is then given by:

$$TAP=\gamma+\dot{\gamma}*\Delta t$$ Equation 2:

Wherein the time step may for example be based on a driver reaction time such as 1.4 seconds, or on the time interval required to extract sensor data updates. In other embodiments, γ̇ may be computed in other ways, such as by subtracting a value of γ at the current time step from the value at the preceding time step.

In some embodiments, predicted trailer angle can be calculated by extracting continuous sensor data (speed sensor, steering angle sensor converted to tire angle, and trailer angle) at a specific time interval, then holding that extracted speed and tire angle constant for a fixed time (e.g., the driver reaction time). By defining the speed and tire angle input signals (vs. time) and knowing the initial trailer angle condition from the same extraction time, the trailer angle over the driver reaction time can be solved for using equation 1, thus generating the predicted trailer angle with the same time interval as the data extraction. It should be noted that there may be a time delay between the TAP calculation and the sensor data extraction due to calculation time. However, with high enough processing speed, this time delay can be made negligible.

When predicted trailer angle (TAP) exceeds a threshold angle (THA), the driver may be instructed to brake. After the brake warning is displayed and the driver has stopped the vehicle, if TAP<=THA, a corrective steering direction indicator (counter steer graphic) is displayed, and if TAP>THA, a Drive Forward indicator is displayed.

In step 910, the method 900 includes setting a jackknife warning flag JKWflag to zero and initiating or continuing the operation of a Trailer Backup Guide (TBG) method, the steps of which are provided below.

In step 920, the method checks whether a computed value of the predicted trailer angle TAP exceeds a pre-defined threshold angle THA. If no, execution returns to step 910. If yes, execution proceeds to step 930.

In step 930, the jackknife warning flag JKWflag is set to one, and execution then proceeds to step 942.

In step 942, the method determines that an extreme trailer angle is predicted, and that braking should take place. In step 944, an optional buzzer is sounded to alert the driver to the need for braking. In step 946, a brake warning is displayed to the driver, and maintained until the brake pedal is pressed and the vehicle comes to a stop.

In step 948, the method checks whether the predicted trailer angle TAP is less than the pre-defined threshold angle THA, multiplied by a tuning parameter P7. If yes, the trailer is no longer in immediate danger of a jackknife condition, and execution returns to step 910. If no, execution proceeds to step 949.

In step 949, the method checks whether the velocity V of the vehicle is equal to zero, and the predicted trailer angle TAP is greater than the pre-defined threshold THA. If yes, execution proceeds to step 980. If no, execution proceed to step 950.

In step 950, based on the check performed at step 948, the velocity of the vehicle is known to be zero and the predicted trailer angle TAP is known to be less than the pre-defined threshold THA. Execution therefore proceeds to step 960.

In step 960, the trailer angle is known to be near, but not over, the limit for a jackknife condition, and so the method displays counter-steering instructions (e.g., turn wheel left or turn wheel right) to the driver. Execution then proceeds to step 970.

In step 970, the method determines whether the predicted trailer angle TAP is greater than the pre-defined threshold angle THA. If yes, execution returns to step 942. If no, execution returns to step 960. (In some embodiments, step 970 is included in case the driver starts backing up again such that V is not equal to 0, and the trailer is swinging back towards the jackknife angle JK such that TAP>THA, so the method then displays a brake message, buzzer, and graphic again.)

In step 980, the method instructs the driver to drive forward to straighten the trailer with respect to the vehicle (e.g., to reduce the trailer angle). Execution then proceeds to step 985.

In step 985, the method determines whether: the velocity V is not equal to zero AND the predicted trailer angle TAP is greater than the pre-defined threshold angle THA. If yes (e.g., if both of these conditions are true), execution returns to step 942. If no (e.g., if either or both of these conditions are not true), execution proceeds to step 990.

In step 990, the method determines whether the predicted trailer angle TAP is less than the pre-defined threshold angle THA, multiplied by a tuning parameter P8. If yes, execution returns to step 910. If no, execution returns to step 980.

Numerous variations are possible without departing from the spirit of the present disclosure. In some embodiments, the method may display a brake message, graphic, and audible buzzer until V=0. When V=0, check TA vs. THA (at V=0, TA=TAP). If TA>THA, the driver can't correct and must drive forward. If TA<=THA, the driver can correct, and a counter-steer graphic is shown. In some embodiments, when showing the counter-steer graphic, the trailer swing arrow 630 is displayed until V=0, and at V=0, the trailer swing arrow 630, acting as a trailer swing direction predictor, doesn't flip directions until driver has turned steering wheel enough, hence indicating to the driver it is safe to release the brake and start backing up as the trailer will swing away from the jackknife angle JK. In some embodiments, the trailer direction indicator is displayed when vehicle and trailer are moving, and also when they are stationary. With a moving trailer, the trailer direction indicator indicates direction of the trailer. With a stationary trailer, the trailer direction indicator predicts swing direction of the trailer based upon current position of steering wheel, should movement of the trailer resume. The term "predict" is used here because while the trailer is stationary and the driver turns the steering wheel past a threshold, the indicator will flip, indicating to driver it is safe to release the brake because when doing so, the trailer will swing away from the jackknife angle JK.

Figure 10:
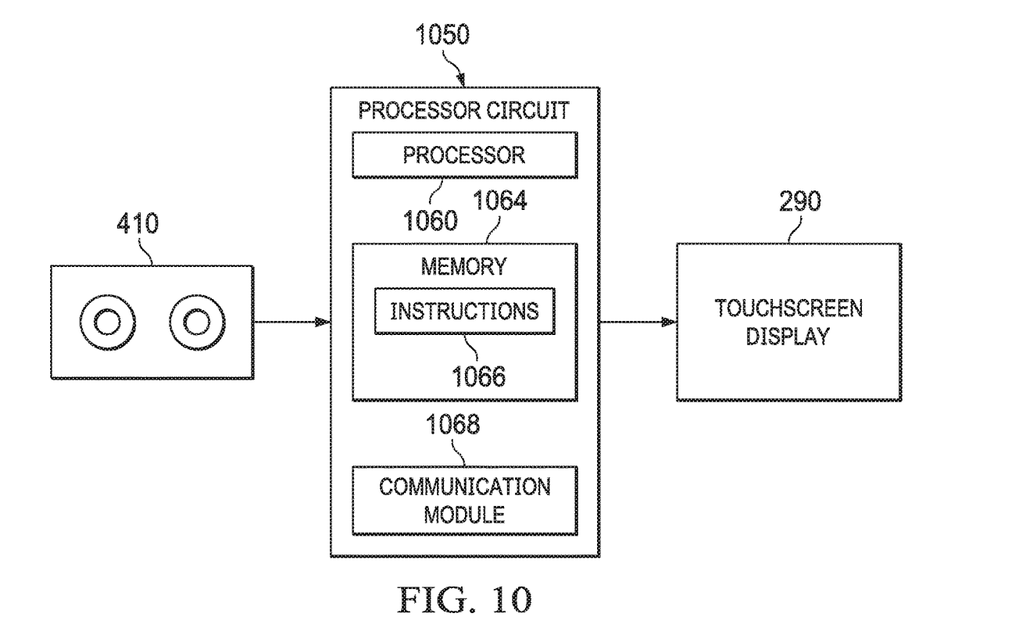
FIG. 10 is a diagrammatic illustration of a processor circuit, according to embodiments of the present disclosure.

FIG. 10 is a diagrammatic illustration of a processor circuit 1050, according to embodiments of the present disclosure. The processor circuit 1050 may be implemented in the trailer jackknife warning system 100, VCU 110, portable device 300, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also comprise another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the trailer jackknife warning system 100. The communication module 1068 may communicate within the processor circuit 1050 through numerous methods or protocols. Serial communication protocols may include but are not limited to US SPI, $I^2C$, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and a central server, or readings from the sensors) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

In the example shown in FIG. 10, the processor circuit 1050 receives sensor data from a sensor 410, and sends output to a display 290.

As will be readily appreciated by those having ordinary skill in the art after becoming familiar with the teachings herein, the trailer jackknife warning system advantageously permits a driver to have situational awareness of an impending jackknife condition as a trailer is moved backward by an attached vehicle, and to receive, in icon form, steering, braking, or drive-forward instructions for avoiding or mitigating the jackknife condition. Depending on the implementation, a number of variations are possible on the examples and embodiments described above. For example, different kinds of sensors may be employed, and different displays or views may be generated. The technology may be applied to different vehicle types, including on-road and off-road vehicles. Sensors and/or processors may be located on the trailer, on the vehicle, or external to the vehicle and trailer.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the trailer jackknife warning system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the trailer jackknife warning system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system comprising:
a vehicle;
a trailer;
a trailer angle between a centerline of the vehicle and a centerline of the trailer;
a display screen; and
a brake warning icon,
wherein, at least one time step after the vehicle is driven backward such that the trailer angle increases beyond a threshold value, the brake warning icon is displayed on the display screen; and
a steering warning icon,
wherein, if the trailer angle is beyond the threshold value and the vehicle is stopped, the steering warning icon is displayed on the display screen, and
wherein, when the trailer angle decreases below the threshold value, the steering warning icon is removed from the display screen.

2. The system of claim 1, wherein the steering warning icon comprises a steering wheel representation and a turning direction instruction to reduce the trailer angle.

3. The system of claim 2, wherein the steering wheel representation includes an angle of the steering wheel indicative of a desired turning direction to reduce the trailer angle.

4. The system of claim 1, wherein after the vehicle is stopped, if the trailer angle is greater than the threshold value, a drive-forward warning icon is displayed on the display screen to instruct the vehicle driver to drive the vehicle forward.

5. The system of claim 1, wherein a representation of the vehicle is displayed along with the steering warning icon.

6. The system of claim 1, wherein a trailer direction indicator is displayed along with the steering warning icon, wherein the trailer direction indicator indicates a direction the trailer will travel based on a current position of a steering wheel of the vehicle.

7. The system of claim 1, wherein the at least one time step is based on a human reaction time.

8. The system of claim 7, wherein the trailer angle is a predicted trailer angle.

9. The system of claim 1, wherein if the vehicle is stopped, the brake warning icon is removed from the display screen.

10. A method for directing a trailer of a vehicle, the method comprising:
for a vehicle with a trailer attached, while the vehicle is moving in a reverse direction:
measuring a measured trailer angle between a centerline of the vehicle and a centerline of the trailer;
predicting a predicted trailer angle at least one time step in the future based on the measured trailer angle;
when, if the vehicle is being driven backward, the predicted trailer angle is greater than a threshold value, displaying a brake warning icon on a display screen of the vehicle;
when, if the vehicle is stopped, the predicted trailer angle is beyond the threshold value, displaying a steering warning icon on the display screen; and
when the predicted trailer angle decreases below the threshold value, removing the steering warning icon from the display screen.

11. The method of claim 10, wherein the steering warning icon comprises a steering wheel representation and a turning direction instruction to reduce the predicted trailer angle.

12. The method of claim 11, wherein the steering wheel representation includes an angle of the steering wheel indicative of a desired turning direction to reduce the predicted trailer angle.

13. The method of claim 10, wherein after the vehicle is stopped, if the predicted trailer angle is greater than the threshold value, a drive-forward warning icon is displayed on the display screen to instruct the vehicle driver to drive the vehicle forward.

14. The method of claim 10, wherein a representation of the vehicle is displayed along with the steering warning icon.

15. The method of claim 10, wherein a trailer direction indicator is displayed along with the steering warning icon, wherein the trailer direction indicator indicates a direction the trailer will travel based on a current position of a steering wheel of the vehicle.

16. The method of claim 10, wherein the at least one time step is based on a human reaction time.

17. The method of claim 10, further comprising, if the vehicle is stopped, removing the brake warning icon from the display screen.

18. A device for directing a trailer of a vehicle while the vehicle is backing up, the device comprising:

- a sensor for measuring a measured trailer angle between a centerline of the vehicle and a centerline of the trailer;
- a display screen; and
- a processor configured to:
  - compute a predicted trailer angle based on the measured trailer angle;
  - display, on the display screen, a brake warning icon when the predicted trailer angle exceeds a threshold value while the vehicle is moving backward;
  - display, on the display screen, a steering warning icon when the predicted trailer angle exceeds the threshold value and the vehicle is stopped; and
  - remove the steering warning icon from the display screen when the predicted trailer angle decreases below the threshold value,
  - wherein the steering warning icon comprises a steering wheel representation and a turning direction instruction to reduce the trailer angle, and
  - wherein the steering wheel representation includes an angle of the steering wheel indicative of a desired turning direction to reduce the trailer angle.

* * * * *